(12) United States Patent
Andres et al.

(10) Patent No.: US 8,934,765 B2
(45) Date of Patent: *Jan. 13, 2015

(54) PORTABLE PHOTO BOOTH

(71) Applicant: EZ Photobooths LLC, Chino, CA (US)

(72) Inventors: Marlon Andres, West Covina, CA (US); Rey Borja, West Covina, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,716

(22) Filed: May 23, 2014

(65) Prior Publication Data

US 2014/0255015 A1    Sep. 11, 2014

Related U.S. Application Data

(63) Continuation of application No. 13/612,823, filed on Sep. 12, 2012, now Pat. No. 8,737,828.

(60) Provisional application No. 61/533,748, filed on Sep. 12, 2011.

(51) Int. Cl.
*G03B 17/53* (2006.01)

(52) U.S. Cl.
CPC .................................... *G03B 17/53* (2013.01)

USPC .......................................................... 396/2

(58) Field of Classification Search
CPC ..... G03B 17/53; G03B 15/06; H04N 1/00289
USPC .......................................................... 396/2
See application file for complete search history.

(56) References Cited

U.S. PATENT DOCUMENTS

| | | |
|---|---|---|
| 5,828,908 A | 10/1998 | Mauchan |
| 5,875,519 A | 3/1999 | Chou |
| 6,164,442 A * | 12/2000 | Stravitz .......................... 206/233 |
| 2012/0087643 A1 * | 4/2012 | Paramadilok ...................... 396/2 |
| 2012/0247990 A1 * | 10/2012 | Hsiao ............................ 206/320 |

* cited by examiner

*Primary Examiner* — Clayton E Laballe
*Assistant Examiner* — Dennis Hancock
(74) *Attorney, Agent, or Firm* — Trojan Law Offices

(57) ABSTRACT

A portable photo booth is disclosed which emphasizes reduced size and increased portability by utilizing a two-piece case which can be quickly assembled and disassembled. When assembled, the case will expose a camera and touch screen for taking photos in series, which can then be printed using a photo printer. When disassembled, the case will provide a very secure and robust environment, protecting the internal components from the elements.

18 Claims, 6 Drawing Sheets

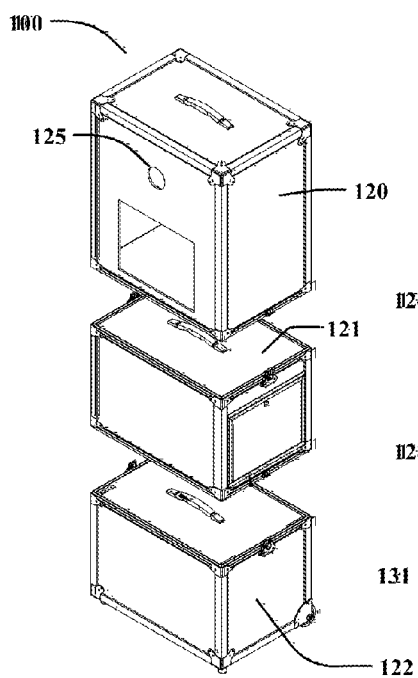
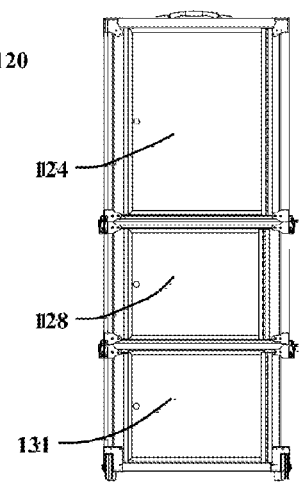
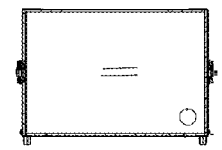
FIG. 14
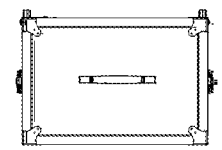
FIG. 15
FIG. 12
FIG. 13
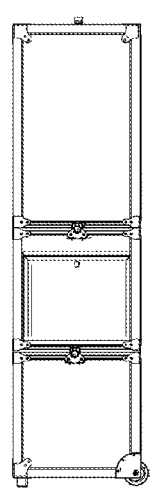
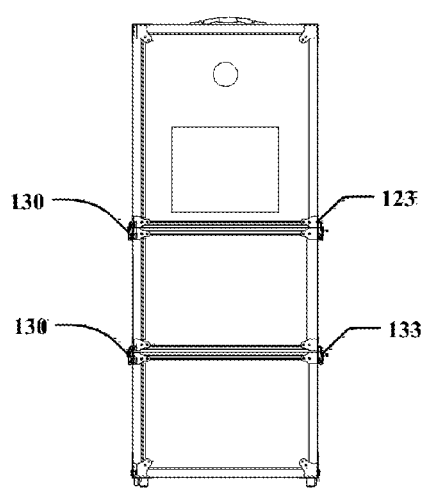
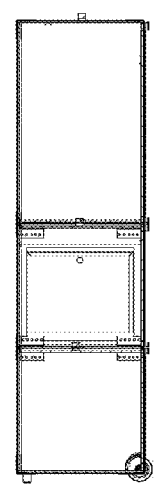
FIG. 16
FIG. 17
FIG. 18

PORTABLE PHOTO BOOTH

CROSS-REFERENCE TO RELATED APPLICATIONS

This application claims benefit of, and is a continuation of U.S. patent application Ser. No. 13/612,823, filed on Sep. 12, 2012, which claims benefit of U.S. Provisional Patent Application No. 61/533,748, filed on Sep. 12, 2011, both of which are incorporated herein by reference in their entireties.

STATEMENT REGARDING FEDERALLY SPONSORED RESEARCH AND DEVELOPMENT

Not Applicable.

FIELD OF THE INVENTION

This invention relates generally to portable photography, and more particularly, to a portable all in one photography device that can be assembled and disassembled quickly.

DISCUSSION OF RELATED ART

A camera is a device that captures, records, and stores images. A camera operates with a lens positioned in front of the camera's opening to gather the incoming light and onto a recording surface. In low light situations, a flash is used to provide a burst of light immediately before a photo is captured. Today, most cameras utilize an electronic image sensor to capture images, which provides immediate viewing and printing of captured images.

A photo printer is a peripheral device which can print digital images or photos in high resolution quickly and effortlessly. Typically, a photo printer will communicate with a computer, although newer models can interface directly with digital cameras and their storage media. Photo printers may print images using solid ink, liquid inkjet or toner.

A photo booth is a machine or device that combines a camera, flash, and photo printer to create photos quickly. A photo booth is typically coin-operated and has an automated camera and film processor. Normally, photo booths contain a seat or bench designed to accommodate the users as they are being photographed. An enclosed area is typically provided by curtain or walled structure to allow privacy for those users being photographed. Photos are taken and printed out once payment is received by the booth or the operator.

Photo booths will normally take multiple photo shots, with an indicator to notify users to prepare for their next pose. Once the last photo from the series is taken, the photo booth begins to develop the film or print the digital images. The dimensions of the printed photos vary, as well as the time it takes for the photos to be printed. More advanced technology allows for photos to be printed within seconds, whereas the less advanced technology may take a few minutes. The printing of the photos can be in either black and white or in color.

While photo booths exist in the prior art, they are often fixed and bulky devices that cannot be quickly assembled and disassembled. Although newer technology has reduced the size of cameras, computers, monitors, and printers, photo booths have largely remained the same size. Therefore, a need exists for a photo booth that takes advantage of newer technology by reducing its size and providing portability with a quick assembly and disassembly process. The present invention accomplishes these objectives.

SUMMARY OF THE INVENTION

The present invention will provide a photo booth which takes advantage of newer technology by reducing its size and providing portability with a quick assembly and disassembly process. Furthermore, the present invention will be very secure and robust when packaged in its closed state. This is accomplished by utilizing a two-piece case, providing an enclosure to secure all critical parts of the photo booth in a closed position, while providing the structure of the photo booth in an open position.

The portable photo booth will be ideal for transit when in the closed position. Having the shape of a rectangular prism with durable walls, reinforced aluminum edges, several handles, several recessed latches, four trap doors, and 2 recessed wheels, all components will be well protected. When in the open position, the portable photo booth will expose all internal peripheral devices, including the camera, flash, and touch screen. The user will operate the portable photo booth using a processor-implemented system.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DESCRIPTION OF THE DRAWINGS

FIG. 12 is a perspective exploded view of the portable photo booth in an open position;

FIG. 13 is a front view of the portable photo booth in an open position;

FIG. 14 is a bottom view of the portable photo booth in an open position;

FIG. 15 is a top view of the portable photo booth in an open position;

FIG. 16 is a side view of the portable photo booth in an open position;

FIG. 17 is a front view of the portable photo booth in an open position;

FIG. 18 is a rear view of the portable photo booth in an open position;

DETAILED DESCRIPTION OF THE PREFERRED EMBODIMENT

Figure 1:
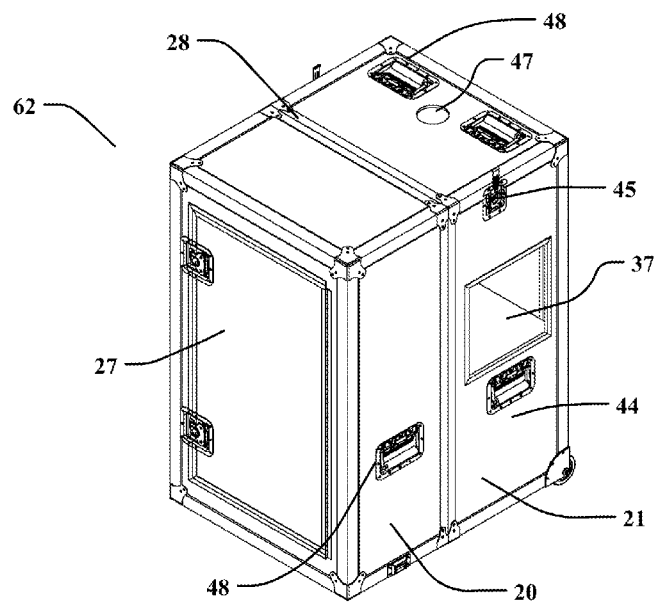
FIG. 1 is a front perspective view of the portable photo booth in a closed position.
Figure 2:
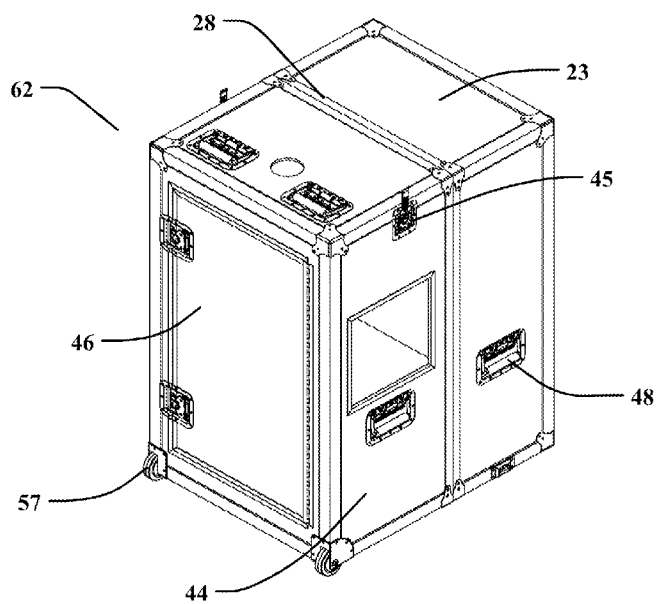
FIG. 2 is a rear perspective view of the portable photo booth in a closed position.
Figure 3:
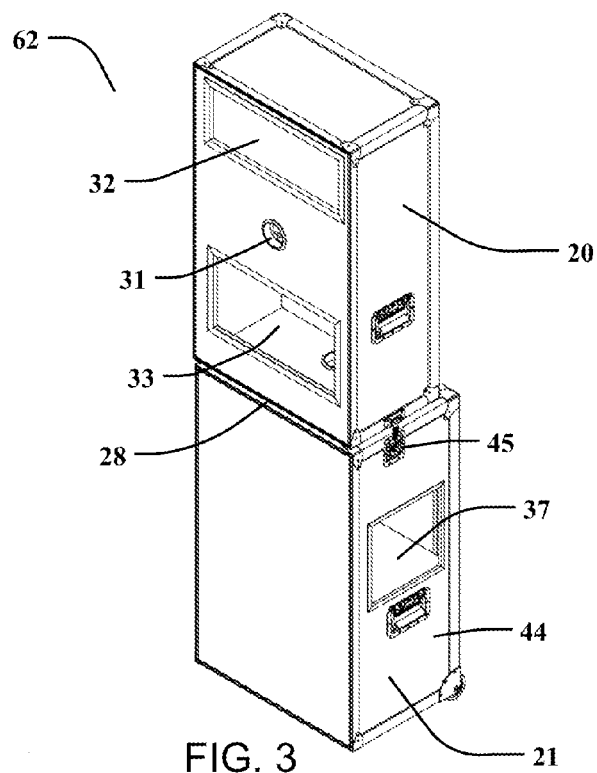
FIG. 3 is a front perspective view of the portable photo booth in an open position.
Figure 4:
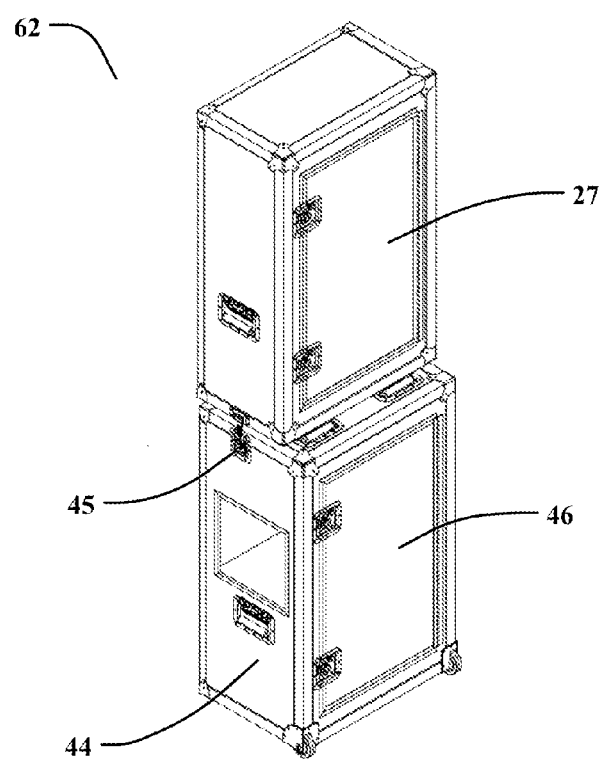
FIG. 4 is a rear perspective view of the portable photo booth in an open position.
Figure 5:
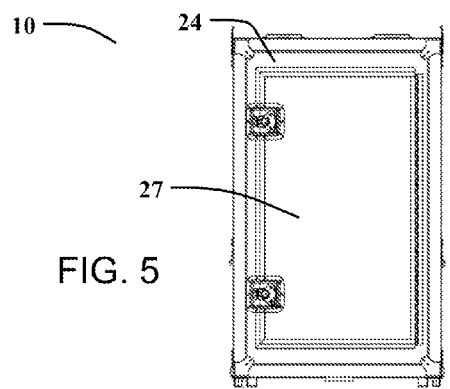
FIG. 5 is a front view of the portable photo booth in a closed position.
Figure 6:
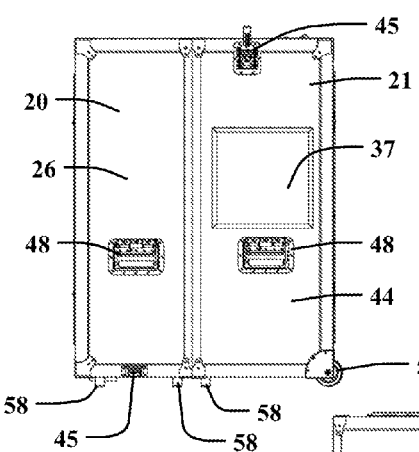
FIG. 6 is a side view of the portable photo booth in a closed position.
Figure 7:
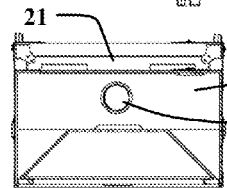
FIG. 7 is a top cross-sectional view of the portable photo booth in an open position.
Figure 8:
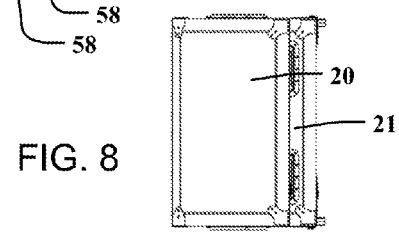
FIG. 8 is a top view of the portable photo booth in an open position.
Figure 9:
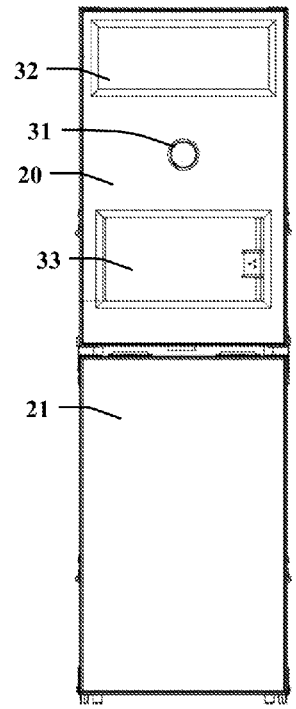
FIG. 9 is a front view of the portable photo booth in an open position.
Figure 10:
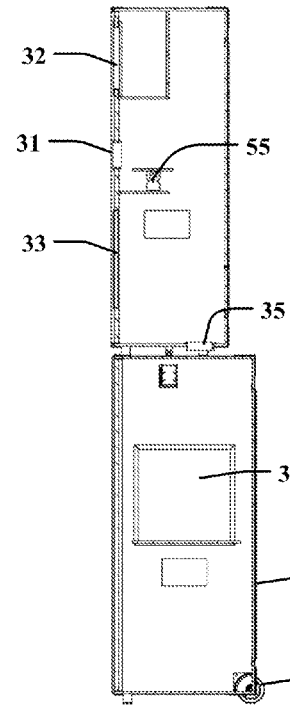
FIG. 10 is a side cross-sectional view of the portable photo booth in an open position.
Figure 11:
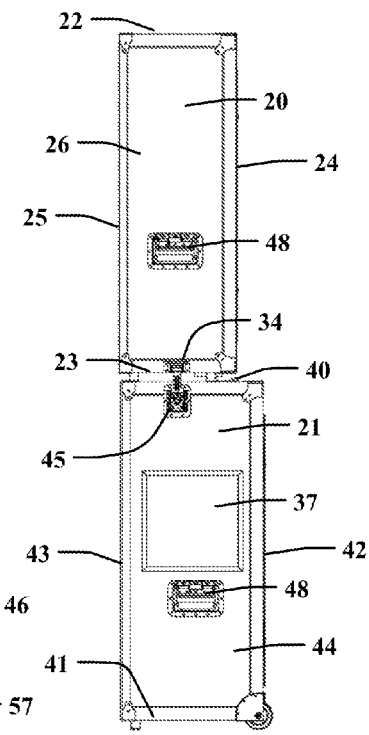
FIG. 11 is a side view of the portable photo booth in an open position.
Figure 19:
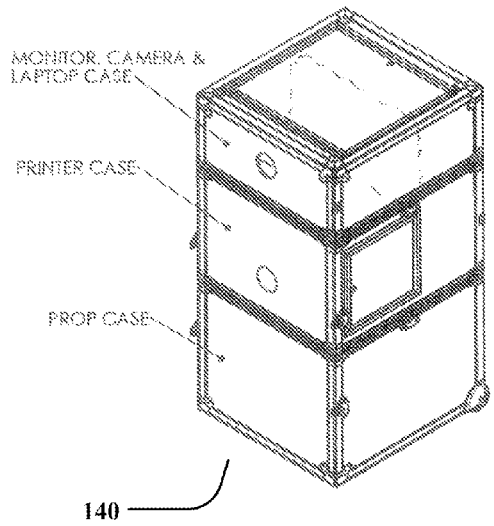
FIG. 19 is a perspective view of the portable photo booth in a closed position.
Figure 20:
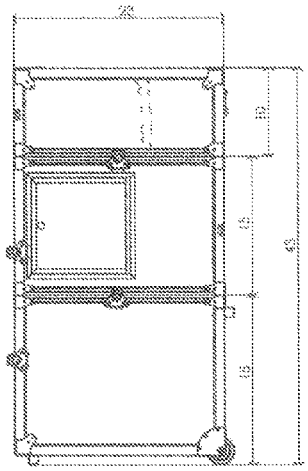
FIG. 20 is a front view of the portable photo booth in a closed position.
Figure 21:
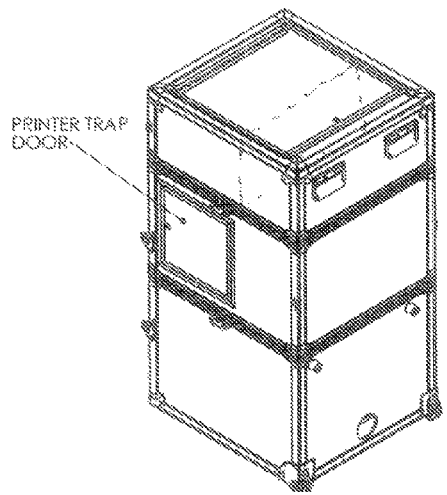
FIG. 21 is a perspective view of the portable photo booth in a closed position.
Figure 22:
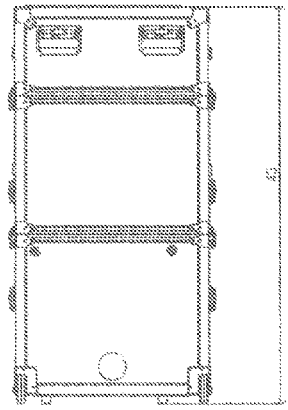
FIG. 22 is a rear view of the portable photo booth in a closed position.
Figure 23:
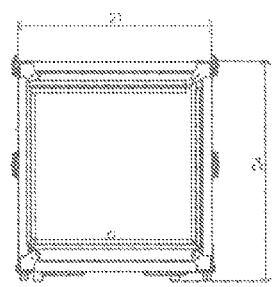
FIG. 23 is a top view of the portable photo booth in a closed position.
Figure 24:
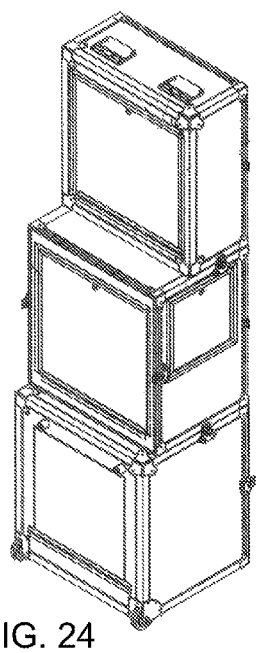
FIG. 24 is a perspective view of the portable photo booth in an open position.
Figure 25:
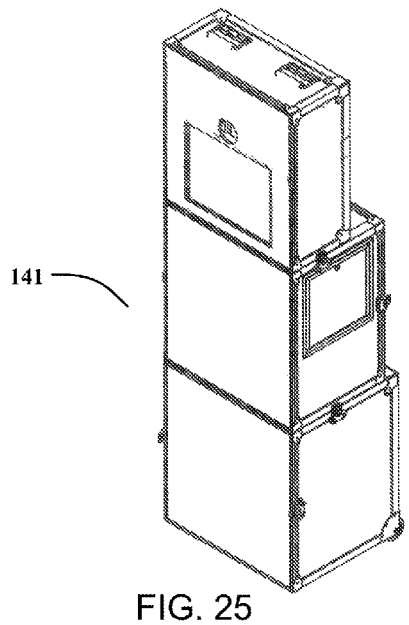
FIG. 25 is a perspective view of the portable photo booth in an open position.
Figure 26:
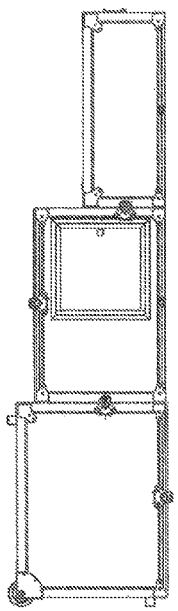
FIG. 26 is a side view of the portable photo booth in an open position.
Figure 27:
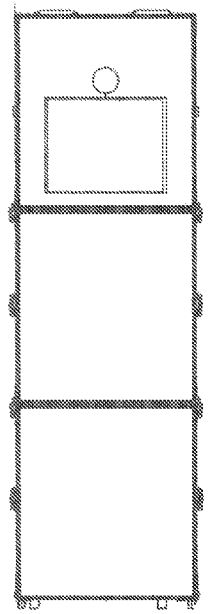
FIG. 27 is a rear view of the portable photo booth in an open position.
Figure 28:
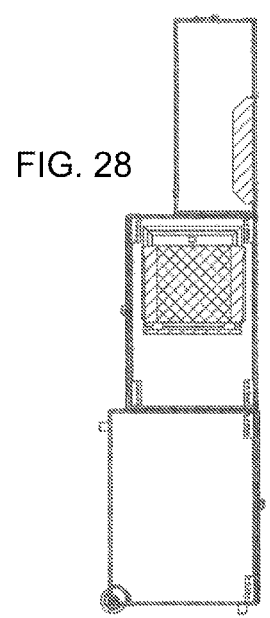
FIG. 28 is a side cross-sectional view of the portable photo booth in an open position.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention comprises a portable photo booth. In the preferred embodiment, the portable photo booth will be self-contained in a two-piece case 62, the two pieces defined as the top section 20 and the bottom section 21. The top section 20 is hollow and generally rectangular, having first top 23, bottom 22, front 24, rear 25, and opposing side surfaces 26. A top door 27 is positioned within the first front surface 24, while a camera aperture 31, flash diffuser 32, and display aperture are positioned within the first rear surface 25. A plurality of top locking mechanisms 34 are positioned between the first top 23 and side surfaces 26 and a cable aperture 35 is positioned within the first top surface 23. Although a plurality elements, such as locking mechanisms, handles, or wheels, may shown in the figures, unless required, having only one of these elements may accomplish the same object of the invention.

The bottom section 21 is also hollow and generally rectangular, also having second top 40, bottom 41, front 43, rear 42, and opposing side surfaces 44. A bottom door 46 is positioned within the second front surface 43, while a bottom cable aperture 47 is positioned within the second top surface 40. Computer and printer compartments 37 are defined within the bottom section 21 and a plurality of bottom locking mechanisms 45 are positioned between the second top surface 40 and side surfaces 44. The top 20 and bottom sections 21 are hingably attached with the bottom locking mechanisms 45 adapted to lockably engage the top locking mechanisms 34.

The portable photo booth further comprises a camera aligned with the camera aperture 31, a display 33 aligned with the display aperture, a computer system enclosed within the computer compartment 37, and a printer positioned within the printer compartment. In the preferred embodiment, the display 33 is a touchscreen display and the camera is attached and aligned using a swivel base 55. The camera, display 33, and flash diffuser 32 are accessible through the top door 27 and the computer compartment and printer are accessible through the bottom door 46.

When in use, the portable photo booth 62 will have a closed position and an open position. In the closed position, the sections will secure all internal parts of the portable photo booth 62 and protect them from outside elements when in transit. In this position, the shape of the portable photo booth is generally a square prism, where the first and second top surfaces 23, 40 are adjoining and the first and second bottom 27, 41 and side surfaces 26, 44 are adjacent. Lifting handles 48 are located on both top surfaces 23, 40 and all side surfaces 26, 44.

In the open position, the portable photo booth 62 will expand to expose the flash diffuser 32, camera, and display 33. In this position, the shape of the portable photo booth 62 is generally an elongated rectangular prism, where the first and second top surfaces 23, 40 are facing and the first and second front 24, 43, rear 25, 42, and side surfaces 26, 44 are adjacent. The top and bottom locking mechanisms 34, 45 may be engaged therewith to retain the device in the open position, with the wires for the peripheral devices fed through the top and bottom cable apertures 35, 47 to provide a cleaner look for the device when in operation.

A processor-implemented software system will be utilized to operate the camera, flash, touch screen 33, and printer. The system will receive input from the user through the touch screen 33, provide a timer for a pose, take a series of photos in series, and display the photos for the user. If the user approves, the processor-implemented software system will print the images using the printer. The preferred embodiment is not coin or money operated, although the processor-implemented system can be modified to accept payments.

In the closed position, the portable photo booth 62 will be approximately 39 inches tall, 23 inches wide, and 29 inches deep. In the open position, the portable photo booth 62 will be approximately 76 inches tall, 23 inches wide, with the top section being 13 inches deep and the bottom section being 16 inches deep, although the sizes may vary by +/−5 inches. The walls will be made of a rigid and durable material capable of resisting impact, such as ABS plastic.

Each edge will be protected with a corner guard made of stainless steel, aluminum, brass, or other durable material, and each corner will be further reinforced with the same materials. Two wheels 57 are located on the two back corners of the bottom section of the portable photo booth 62. Furthermore, two rubber glides 58 are positioned opposite the wheels 57 on the bottom surface 41 of the bottom section 21 to ensure the portable photo booth 62 is level when in the open position.

In an alternative embodiment, a canopy will be provided for the photo booth 62. The canopy will provide drapes and a means to support them, providing the user(s) with an enclosed private area when using the portable photo booth. When not in use, the canopy will fold into the size of a slim briefcase or may be stored within the bottom section 21.

In a further alternative embodiment, the portable photo booth will be self-contained in a three-piece case 100 having top 120, middle 121, and bottom sections 122. The top section 120 will comprise a plurality of top locking mechanisms 123, a top door 124, a camera aperture 125, a top cable aperture, and a display aperture. The a middle section 121 will comprise a middle door 128, a middle cable aperture, and a plurality of middle locking mechanisms adapted to lockably engage the plurality of top locking mechanisms 130. The bottom section 122 will comprise a bottom door 131, a bottom cable aperture, and a plurality of bottom locking mechanisms adapted to lockably engage the plurality of middle locking mechanisms.

In this embodiment, a camera is aligned with the camera aperture 125 and a touchscreen display is aligned with the display aperture. A printer and computer system are positioned within the middle section 121, with the bottom section used to prop the middle 121 and top sections 120 up and for additional storage. Again, the camera, touchscreen display, printer, and computer system are operably connected such that a series of photos are taken using the camera and flash diffuser and printed using said printer when said computer system is initiated by the touchscreen device.

This device will also attach differently. When in the closed position, the top 120, middle 121, and bottom sections 122 are stacked horizontally such that the camera and touchscreen display are not exposed. The locking mechanisms 123, 130 may be engaged to retain the device in the closed position. When in the open position, the top, middle, and bottom sections are positioned vertically such that the camera and touchscreen display are exposed. Again, the locking mechanisms may be engaged to retain the device in the open position.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A portable photo booth comprising:
   a top section comprising a first top surface, a first bottom surface, a first front surface, a first rear surface, first opposing side surfaces, and at least one top locking mechanism positioned between said first top surface and at least one of said first opposing side surfaces, wherein said first front surface further comprises a top door therethrough, said first rear surface further comprises a camera aperture;
   a bottom section comprising a second top surface, a second bottom surface, a second front surface, a second rear surface, second opposing side surfaces, and at least one bottom locking mechanism positioned between said second top surface and at least one of said second opposing side surfaces adapted to lockably engage said plurality of top locking mechanisms; and
   at least one handle positioned about at least one of said top and bottom sections;
   wherein said top and bottom sections are hingably attached between said first and second top surfaces to permit the photo booth to be hingably rotated along the first and second top surfaces from a closed configuration to an open configuration without detaching said top section from said bottom section;
   wherein said closed configuration is characterized as having said first rear surface of said top section face said second front surface of said bottom section; and,
   wherein said open configuration is characterized as having said first top surface of said top section face said second top surface of said bottom section.

2. The portable photo booth of claim 1, further comprising:
   a closed position wherein said first and second top surfaces are adjoining, and said first and second bottom and side surfaces are adjacent;
   an open position wherein said first and second top surfaces are facing, and said first and second front, rear, and side surfaces are adjacent, and wherein said at least one top and bottom locking mechanisms may be engaged therewith to retain said top and bottom sections in the open position.

3. The portable photo booth of claim 2, further comprising a camera aligned with said camera aperture, a display aligned with a display aperture, a computer compartment enclosed within said bottom section, and a printer positioned within a printer compartment, wherein said camera and display are accessible through said top door and said computer compartment is accessible through said bottom door.

4. The portable photo booth of claim 3, wherein said top section further comprises a swivel base camera holder for aligning said camera with said camera aperture, said swivel base camera holder accessible through said top door.

5. The portable photo booth of claim 3, wherein said display is a touchscreen display.

6. The portable photo booth of claim 5, further comprising a computer system positioned within said computer compartment, and a processor-implemented method stored within said computer system for integrating said camera, flash diffuser, touchscreen display, and printer such that one or more photos will be taken using the camera and flash diffuser and printed using the printer, said processor-implemented method initiated through said touchscreen display.

7. The portable photo booth of claim 6, wherein said open position further comprises cables operably connecting said flash diffuser, said camera, and said touchscreen display traveling through a top cable aperture and a bottom cable aperture to said printer and computer system.

8. The portable photo booth of claim 2, further comprising at least one wheel positioned between said second bottom surface and said second front surface such that said portable photo booth can be tilted and easily moved in said closed position.

9. The portable photo booth of claim 8, further comprising at least one adjustable protrusion positioned opposite said at least one wheel on said second bottom surface and operate to level said portable photo booth with said at least one wheel.

10. The portable photo booth of claim 2, wherein said open position further comprises a canopy adapted to create an enclosed area facing said camera, said flash diffuser, and said display.

11. A portable photo booth comprising:
 a top section comprising at least one top locking mechanism, a top door, a top cable aperture, a camera aperture, a flash diffuser, and a touchscreen display aperture;
 a bottom section comprising a bottom door, a printer compartment, computer system compartment, and a bottom cable aperture, and further comprising a plurality of bottom locking mechanisms adapted to lockably engage said plurality of top locking mechanisms;
 at least one handle;
 a closed position wherein said top and bottom sections are positioned such that said camera aperture, said flash diffuser, and said touchscreen display aperture are not exposed; and
 an open position wherein said top and bottom sections are positioned such that said camera aperture, flash diffuser, and touchscreen display aperture are exposed, and wherein said at least one of top and bottom locking mechanisms may be engaged therewith to retain said top and bottom sections in the open position;
 wherein said top section and said bottom section are hingably attached to permit the photo booth to rotate from said closed position to said open position without detaching said top section from said bottom section.

12. The portable photo booth of claim 11, further comprising:
 a camera aligned with said camera aperture;
 a touchscreen display aligned with said touchscreen display aperture;
 a printer positioned within said printer compartment; and
 a computer system positioned within said computer system compartment;
 wherein said camera, said touchscreen display, said printer, said flash diffuser, and said computer system are operably connected such that at least one photo is taken using said camera and said flash diffuser and printed using said printer when said computer system is initiated by said touchscreen device.

13. The portable photo booth of claim 12, wherein said camera and said touchscreen display are accessible through said top door and said computer compartment is accessible through said bottom door.

14. The portable photo booth of claim 12, the top section further comprising a swivel base camera holder for aligning said camera with said camera aperture, said swivel base camera holder accessible through said top door.

15. The portable photo booth of claim 12, further comprising a processor-implemented method stored within said computer system for integrating said camera, said flash diffuser, said touchscreen display, and said printer such that at least one photo will be taken using the camera and flash diffuser and printed using the printer, said processor-implemented method implemented within said computer system and initiated through said touchscreen display.

16. The portable photo booth of claim 12, wherein cables operably connecting said flash diffuser, said camera, and said touchscreen display travel through said top and bottom cable apertures to said printer and computer system.

17. The portable photo booth of claim 11, further comprising a plurality of wheels positioned on said bottom section such that said portable photo booth can be tilted and easily moved in said closed position, and said at least one adjustable protrusion positioned opposite said at least one wheel such that said at least one adjustable protrusion level said portable photo booth with said at least one wheel.

18. The portable photo booth of claim 11, wherein said open position further comprises a canopy adapted to create an enclosed area facing said camera, said flash diffuser, and said display.

* * * * *